Aug. 31, 1948. R. G. TURNER 2,448,161
THREAD CONTROL FOR AUTOMATIC LOOMS
Filed Feb. 4, 1947 3 Sheets-Sheet 1
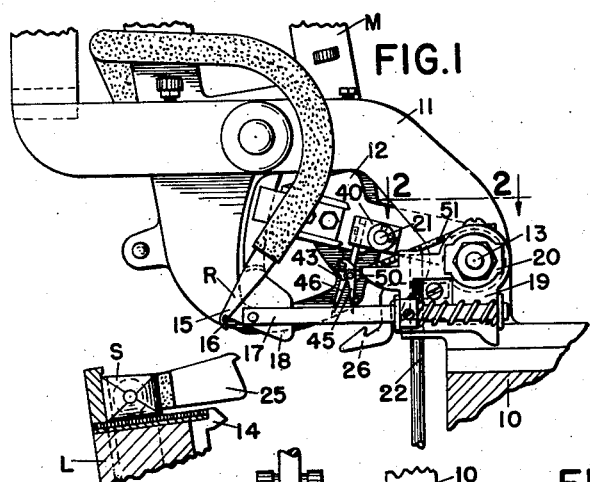
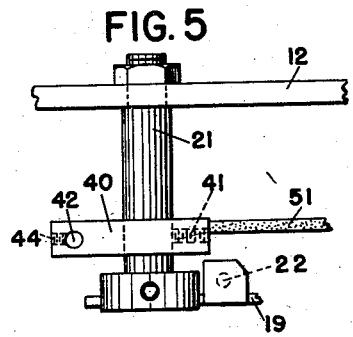
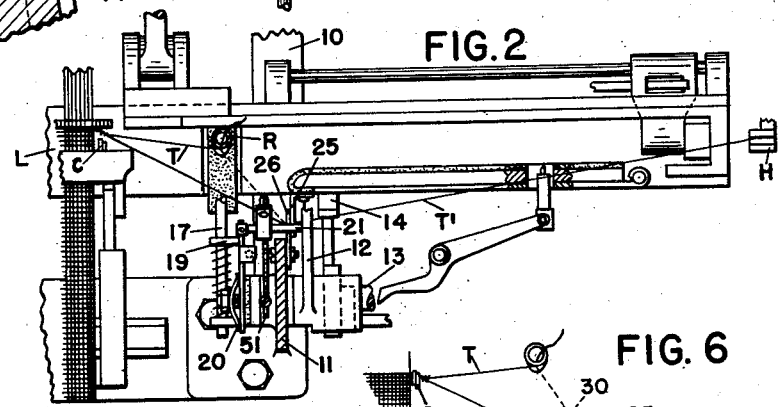
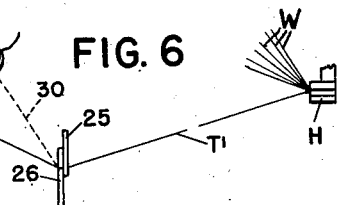
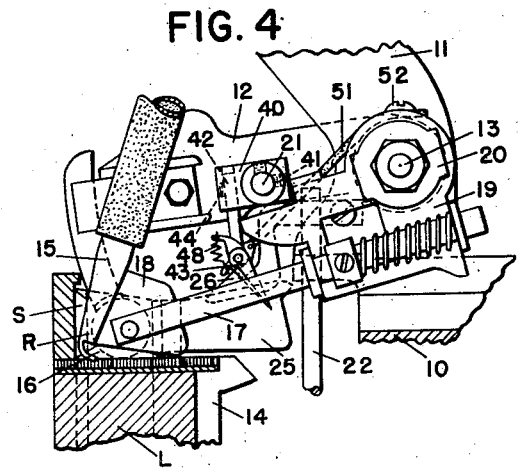
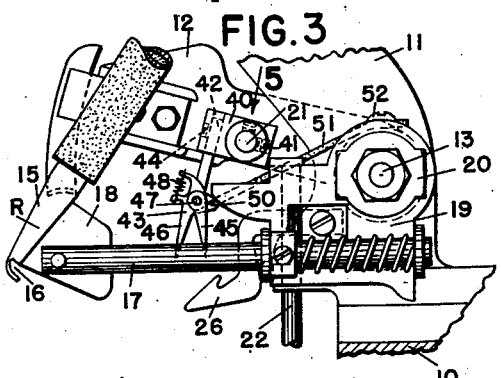
INVENTOR
RICHARD G. TURNER
ATTORNEY Aug. 31, 1948.            R. G. TURNER                 2,448,161
                 THREAD CONTROL FOR AUTOMATIC LOOMS
Filed Feb. 4, 1947                              3 Sheets-Sheet 2

INVENTOR
RICHARD G. TURNER
Chas. F. Hawley
ATTORNEY

Aug. 31, 1948.   R. G. TURNER   2,448,161
THREAD CONTROL FOR AUTOMATIC LOOMS
Filed Feb. 4, 1947   3 Sheets-Sheet 3
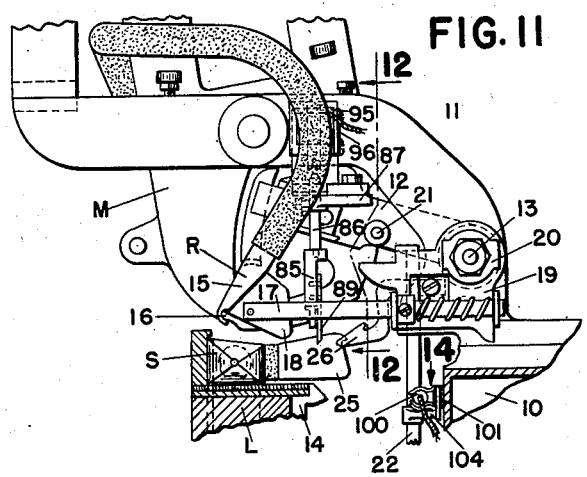
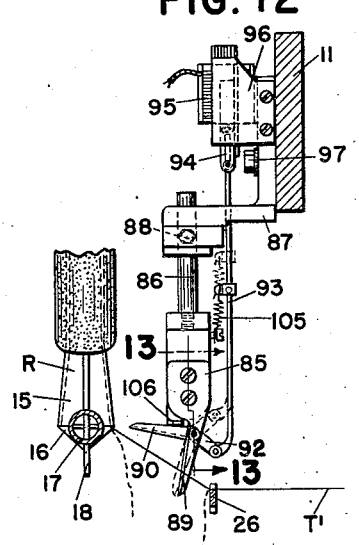
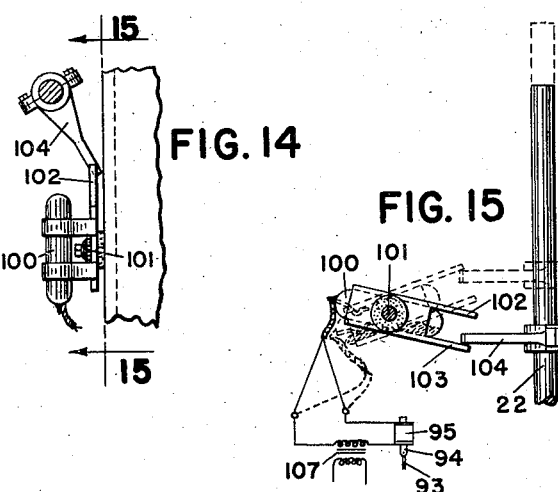
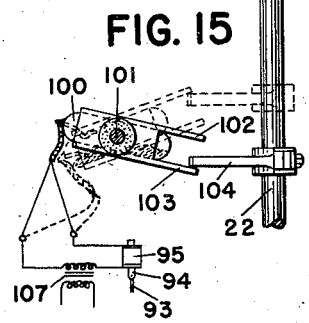
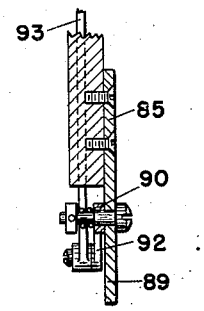
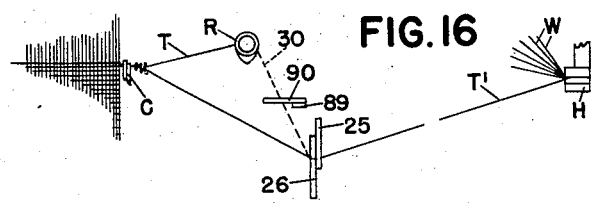
INVENTOR
RICHARD G. TURNER
ATTORNEY Patented Aug. 31, 1948

2,448,161

UNITED STATES PATENT OFFICE 2,448,161

THREAD CONTROL FOR AUTOMATIC LOOMS

Richard G. Turner, Worcester, Mass., assignor to Crompton & Knowles Loom Works, Worcester, Mass., a corporation of Massachusetts Application February 4, 1947, Serial No. 726,297

31 Claims. (Cl. 139—256)

1

This is a continuation in part of my copending application Serial No. 582,505, filed March 13, 1945, now abandoned.

This invention relates to improvements in pneumatic thread controls for weft replenishing looms and it is the general object of the invention to provide means for removing two weft ends or threads which may accidentally become attached to each other and extend to two different thread removing instrumentalities neither of which is sufficiently strong to overpower the other.

At the time of a weft replenishing operation in a loom two weft ends or threads ordinarily remain, one left by the depleted expelled bobbin and the other left by the fresh or incoming bobbin. Both of these threads are attached to the selvage where they are cut by the temple cutter a few picks after the replenishing operation. In order to produce perfect cloth it is necessary to remove these threads to prevent them from being drawn into the warp shed. In the past I have proposed pneumatic devices by which each of these threads may be removed, these devices being shown for instance in my prior Patents Nos. 2,199,353 and 2,199,354. One of these patents shows a pneumatic thread remover located between the reserve bobbin magazine and the selvage to remove the thread of the outgoing bobbin, and the other patent shows a pneumatic thread holder located beyond the outer end of the magazine for removal of the thread left by the incoming bobbin.

Many types of yarns are sufficiently smooth to separate readily when cut simultaneously at the selvage, in which case each thread can be removed by the pneumatic control corresponding to it. There are certain types of yarns, however, which have rough hairy surfaces of such a nature that they become matted together or attached to each other either prior to or during the cutting operation at the selvage. When this matting occurs the remover draws into itself the thread normally extending into it and also part of the other thread which extends to the holder. It is an important object of my present invention to provide cutting mechanism which will cut the thread held by both pneumatic devices so that each of its severed parts can be removed from the loom.

There is ordinarily provided a stationary hook which holds the thread leading to the holder in forward position favorable for its removal. That part of the thread extending from the holder to the remover which lies between the hook and

2 the remover occupies an abnormal position. It is a further object of my present invention to provide thread cutter mechanism having a zone of operation between the intake mouth of the thread remover and the aforesaid hook. By thus locating the cutter assurance is given that it will cut only an abnormally placed thread and will not cut threads which extend normally from the selvage to the thread remover and to the hook.

In the following description there are set forth three different types of cutters for cutting the thread extending between the thread holder and thread remover. In the preferred form the cutter has normally open blades and moves downwardly under action of the transferrer arm on a replenishing beat of the loom to cut the abnormally placed thread. In the first modification the cutter is substantially stationary and is opened by downward movement of the thread remover incident to a replenishing operation. As the remover returns to its normal raised position it first moves the abnormally placed thread between the open blades of the cutter, and then closes the latter to cut the thread. In the second modification the cutter is in such position that the two pneumatic devices, when attracting threads joined together subsequent to selvage cutting, can move one of the threads into position to be cut while the remover is in its normal raised position. The cutter is subsequently closed by mechanism which is preferably independent of the replenishing operation of the loom and moves periodically, such as at one or two pick intervals, so that the thread can be removed from the loom shortly after it has been cut at the selvage.

With these and other objects in view which will appear as the description proceeds, my invention resides in the combination and arrangement of parts hereinafter described and set forth.

In the accompanying drawings, wherein three forms of the invention are set forth, Fig. 1 is a side elevation of a reserve bobbin magazine as viewed from the interior of the loom and having the preferred form of the invention applied thereto, parts being in section, Fig. 2 is a horizontal section on line 2—2 of Fig. 1, Fig. 3 is an enlarged view of a part of Fig. 1 showing the transferrer arm and parts associated therewith in normal raised inoperative position, the cutter being also raised with its jaws open, Fig. 4 is a view similar to Fig. 3 but showing the transferrer arm, thread remover, and cutter in lowered operating position, Fig. 5 is an enlarged detailed plan view looking in the direction of arrow 5, Fig. 3, Fig. 6 is a diagrammatic view showing the threads in normal position in full lines and indicating in dotted lines the abnormally placed thread, Fig. 7 is a view similar to a part of Fig. 1, partly in section, showing the first modified form of the invention mounted on a stationary support with the thread remover in down or operative position and the thread cutter jaws open, the lay being on front center, Fig. 8 is a view similar to Fig. 7 but showing the relation of the parts after the replenishing operation and showing the thread remover in normal raised position, Fig. 9 is a front elevation looking in the direction of arrow 9, Fig. 8, parts being in section, Fig. 10 is a view similar to Fig. 6 but showing the stationary cutter and the manner in which raising of the abnormally placed thread by the thread remover places it between the blades of the cutter, Fig. 11 is a view similar to part of Fig. 1 showing the second modification of the invention with the cutter mechanism in normal open thread receiving position, Fig. 12 is an enlarged vertical section on line 12—12, Fig. 11, Fig. 13 is an enlarged vertical section on line 13—13, Fig. 12

Fig. 14 is an enlarged plan view in the direction of arrow 14, Fig. 11,

Fig. 15 is a vertical section on line 15—15, Fig. 14, the electric circuit for operating the cutter solenoid being shown diagrammatically, and Fig. 16 is a diagram similar to Figs. 6 and 10, but showing the third form of cutter.

Figure 7:
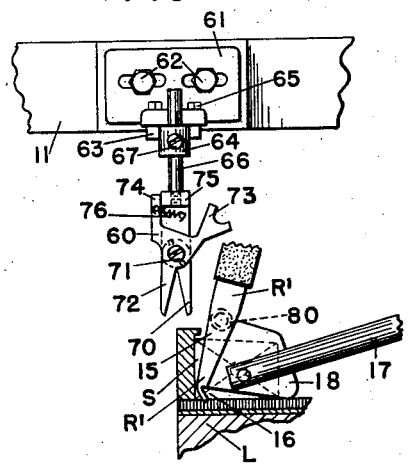

Referring to Fig. 1, there is shown a loom frame 10, lay L, shuttle S and magazine M mounted for oscillation on a support 11 fixed to the loom frame. The magazine is preferably of the multicolor type and holds reserve bobbins not shown of different kinds, but the invention is not necessarily limited to such a magazine. The transferrer arm 12 is pivoted as at 13 with respect to the stand 11 and is normally in raised position, but at the time of a replenishing operation the arm is given an operating stroke to effect bobbin transfer by mechanism not shown but operated by a bunter 14 on the lay.

A pneumatic thread remover designated generally at R has a thread receiving tube 15 provided with a thread intake mouth 16 located near the read end of a forwardly extending supporting rod 17 which is attached to the tube 15 by means of a thread deflecting thin plate 18. Rod 17 is slidably mounted in a bracket 19 normally held in raised position by means of a friction clamp 20. A stud 21 on the transferrer arm overhangs the bracket 19 and lowers the latter at the time of a transferring operation, thereby moving the thread intake mouth 16 from its normally raised position shown in Fig. 3 to its down thread receiving or operating position shown in Fig. 4. This downward motion of the thread remover occurs during forward movement of the lay and the intake mouth is moved to a position behind the thread T extending to the outgoing bobbin. As the lay moves rearwardly it carries the thread T toward the intake mouth, and subatmospheric pressures within the tube 15 draw into the latter that part of the thread T extending to the right of the tube 15. When the lay approaches back center a regularly reciprocating rod 22 moves upwardly to engage a part of bracket 19 and return the latter and remover R to the normal raised position shown in Fig. 3.

Fig. 2 shows a pneumatic thread holder H which receives the right end of a second thread T' attached to the incoming bobbin at the time of the transfer operation. A thread positioner 25 on the lay moves the thread T' over a stationary hook or guide means 26 on the beat-up of the lay next following the replenishing operation. Immediately subsequent to this last beat-up the thread T and T' will occupy the normal positions shown in full lines in Fig. 6. As loom operation continues the point of attachment of these two threads at the cloth selvage advances and eventually the threads are cut by the temple or selvage cutter C.

If the threads are not matted together by the temple cutter, or have not become matted together previous to cutting, they will then be drawn along normal paths suggested in Fig. 6 into their respective pneumatic devices and removed from the loom. If, on the other hand, the threads are of such a nature that repeated beat-up of the reed may have matted them together, or if such matting has resulted from operation of the temple cutter, the threads subsequent to cutting at the selvage will cling together.

The pneumatic remover R and holder H are ordinarily operated by the same source of subatmospheric pressures, such for instance as an air pump not shown operated by the loom, but thread T' is much longer than thread T, and also frictionally engages guide or hood 26. Furthermore, a number of weft ends W, Fig. 6, ordinarily enter the holder and may interfere with immediate removal of the thread T'. The remover R, on the other hand, will generally have but one short thread T extending into it. As a result of these conditions thread T will be promptly drawn into remover R before the holder H can cause much motion of thread T', and is likely to draw the adjacent end of thread T' into the remover. When this happens thread T' is held pneumatically by both of the pneumatic devices, and part of it occupies the abnormal position indicated by dotted line 30, Fig. 6, due to the fact that neither pneumatic device can overpower the force exerted on the thread by the other device.

The preferred form of the invention is shown in Figs. 1 to 6 and provides a cutter mechanism which moves down to cut the abnormally placed part 30 of thread T' on a weft replenishing operation of the loom. A block 40 is held on stud 21 by set screw 41 which permits angular adjustment of block 40 relatively to the transferrer arm and longitudinal adjustment along the stud in a direction transversely of the abnormally placed part 30 of thread T', see particularly Fig. 5. Passing vertically through the block 40 is the stem 42 of a thread parting or cutting mechanism designated generally at 43. The stem is held in adjusted vertical position in the block 40 by set screw 44. The cutter or thread parting mechanism 43 has a blade 45 or jaw fixed with respect to the bottom of stem 42, and has a second movable blade or jaw 46 pivoted on a pin 47 supported by the stem. A light tension spring 48 tends normally to move the pivoted blade toward the open position shown in Fig. 3.

In order that the pivoted blade 46 may be moved relatively to the stationary blade it is provided with a lug 50 to which is attached the lower end of a flexible strap 51 the upper end of which is fixed as at 52 to the stationary magazine support 11. The block 40 is located in such a position on stud 21 that when the cutter blades move downwardly with the transferrer arm they will straddle the thread occupying the dotted line position 30 of Fig. 6.

Under normal conditions when the transferrer arm is raised spring 48 holds the cutter blades 45 and 46 separated or in the open position shown in Fig. 3, and the strap 51 may if desired be slack. During a transferring operation the transferrer arm and stud 21 descend, and in doing so lower the cutter mechanism 43, thereby tightening the strap 51 and causing the latter to swing the pivoted blade 46 about its pivot pin 47 to closed or cutting position. The transferrer arm therefore acts as a loom driven actuator for the cutter mechanism 43 operating incident to a weft replenishing operation. Closing of the cutter occurs after the blades have moved downwardly to a position on opposite sides of the thread, hence the latter can enter the notch between the blades before the latter close. As soon as part 30 of thread T is cut one part of it will be drawn pneumatically into the remover R and the other part into the holder H.

It will be apparent that if one of the threads should occupy the position of the dotted line 30 in Fig. 6 as the result of one transfer and other threads left by later transfers as they occur from time to time should occupy their normal positions these latter threads will not be cut by the mechanism 43, inasmuch as its zone of operation is outside the normal positions of threads T and T', and the normal paths traversed by them to their respective pneumatic removing and holding means. It is for this reason that operation of the cutter will sever only a wrongly placed thread and will not affect threads in their normal position.

As the lay moves rearwardly the rod 22 rises and the parts are moved from the position of Fig. 4 back to their normal position of Fig. 3, the cutter again being open. In this form of the invention it will be noted that the thread in the position of dotted line 30, Fig. 6, is cut by downward movement of the transferrer arm and the cut ends can be removed by their respective pneumatic controls before these controls are called upon to act on the threads left by the next transfer.

The first modified form of the invention shown in Figs. 7 to 10 employs a stationary thread cutter mechanism 60 which is operated by some part of the loom having a motion incident to a weft replenishing operation, such as the remover R. In this form of the invention the support 11 for the magazine is provided with a stand 61 held in adjusted horizontal position by bolts 62, and a small bearing 63 having a hub 64 is held to stand 61 by bolts 65.

The cutter or thread parter mechanism 60 includes a vertical stem 66 held in vertically adjusted position in hub 64 by a set screw 67. The lower end of stem 66 has secured thereto a stationary blade or jaw 70 and carries a pivot pin 71 on which is mounted a movable blade or jaw 72. A pair of arms 73 and 74, shown respectively at the right and left of the upper part of the movable blade 72, Fig. 7, are located for engagement with a head 75 which may be formed as part of the stationary blade 70, or in any other manner made fast with respect to the stem 66. A light spring 76 connecting the left arm 74 with head 75 tends to hold the pivoted blade in the open position shown in Fig. 7 with arm 74 against the head.

Figure 10:
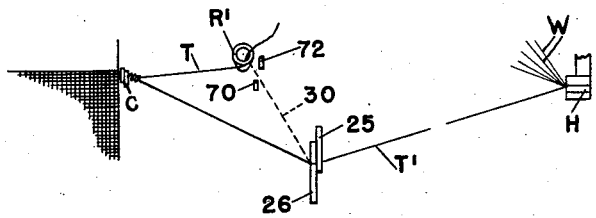

The thread remover is of the type heretofore described in connection with the preferred form of the invention and is designated generally at R'. This remover has rotatably mounted thereon an actuating roller 80 for cooperation with the right or forward arm 73 as viewed in Fig. 8, and normally keeps the cutter closed. Fig. 10, which is similar to Fig. 6, shows the disposition of the threads and the relation of the abnormally placed thread part 30 with respect to the front and back blades 70 and 72.

Figure 8:
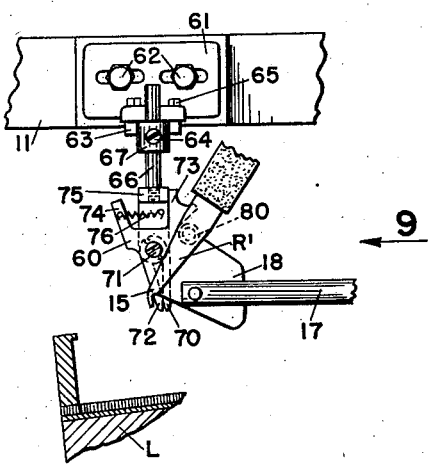
Figure 9:
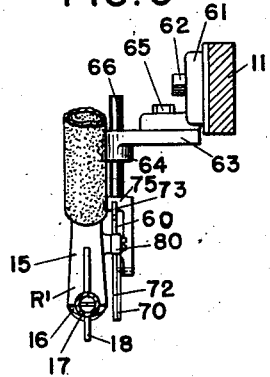

Cutter 60 is mounted so that the lower ends of its blades are above the lay, and the thread remover R' is normally in raised position as shown in Fig. 8. When a replenishing operation occurs the remover R' descends to low position, as already described, and as roller 80 moves away from arm 73 the movable cutter swings rearwardly under action of spring 76, thus opening the cutter. When the rod 22, acting as operating means for the remover, rises during backward movement of the lay subsequent to a transfer operation, the thread part 30 rises and enters the notch or bight between the cutter blades 70 and 72 slightly before actuator roller 80 engages arm 73. Continued upward movement of the remover R' returns the latter to its normal position and completes closing of the cutter mechanism 60 with severance of the thread in a manner similar to that already described in connection with Fig. 6. During upward movement of remover R' the holder H serves to hold the right end of thread T', Fig. 10, and the pneumatic force of the remover keeps the thread taut.

The two forms of the invention thus far described operate incident to a weft replenishing operation of the loom and cut a thread left by a previous replenishing operation. If a second replenishment occurs shortly after a preceding replenishment and after the temple cutter has cut threads T and T' the latter will not remain in the loom very long, but if considerable time is likely to follow temple cutting before another replenishment occurs it may be desirable to cut the thread part 30 soon after it moves to abnormal position. To accomplish this result the third form of the invention can be used wherein the cutter mechanism has regularly recurring operations not dependent upon replenishment.

In the third form of the invention shown in Figs. 11 to 16 the cutter operates at regularly recurring intervals and is not dependent upon replenishing operations of the loom for its actuation. As shown in Figs. 11 and 12 this form of thread parter or cutter, designated generally at 85, is carried by a stem 86 held in adjusted vertical position in a fixed stand 87 by set screw 88. The lower end of the stand has secured thereto a stationary cutter blade 89 to which is pivoted a second blade 90. Blade 90 has an arm 92 pivoted to the lower end of an upright rod 93 the upper end of which is attached to the core 94 of a solenoid 95. The latter is held in fixed position on a bracket 96 which may be secured to the stand 87. The latter is secured to the magazine support 11 as at 97.

A mercury switch 100 for controlling the solenoid 95 is pivoted as at 101 to the frame of the loom, see Fig. 11, and has upper and lower arms 102 and 103 between which extends an operating finger 104 secured in adjusted vertical position on the resetting rod 22.

When the parts are in the normal full line position shown in Fig. 15 and rod 22 is down, a condition existing when the lay is in forward position, the switch 100 will be open and the solenoid will be deenergized. Under these conditions a small spring 105 will exert a downward pull on rod 93 to hold the pivoted blade 90 in the open position shown in Fig. 12. A stop 106 on the cutter mechanism 85 limits upward movement of blade 90.

When rod 22 rises to high position at the end of the backward movement of the lay the parts will be in the dotted line position shown in Fig. 15, finger 104 engaging arm 102 to rock the switch to the closed position. Under these conditions the solenoid 95 will be energized by a transformer 107, see circuit diagram in Fig. 15, and will attract its core, thereby raising rod 93 and causing blade 90 to swing down to the dotted line position shown in Fig. 12. During this downward swinging movement any thread extending between the hook 26 and the remover R will be cut. As the lay swings forwardly rod 22 will descend and engagement of arm 103 by finger 104 will rock the switch 100 to the normal open or full line position shown in Fig. 15, thereby deenergizing the solenoid 95 and permitting spring 105 to reopen the cutter mechanism. The solenoid therefore constitutes a regularly moving actuator which closes the cutter 85 at periodic intervals independently of replenishing operations. When the blades 89 and 90 are in open position that part of thread T' extending from the hook 26 to the remover mouth will lie along a straight line and pass through the bight of the cutter mechanism 85.

In this form of the invention, as in the other forms, it is assumed that the selvage cutter C will operate on front center, hence the matted threads will be released early in the backward stroke of the lay when rod 22 is down and movable blade 90 is in the raised full line position. In those types of pneumatic systems employing a reciprocating pump to provide subatmospheric pressures on the backward stroke of the lay the remover R will be able to draw into itself thread T and also part of thread T' before rod 22 has risen very far and before cutter blade 90 has had any appreciable downward motion. Assurance is thus given that as the thread is drawn pneumatically away from the selvage and toward cutter 85 it will be able to enter the bight between the blades 89 and 90 before the cutter mechanism moves to the closed position indicated in dotted lines Fig. 13 as the lay reaches back center. It will thus be seen that the movable blade 90 descends after the selvage cutter has cut threads T and T' but not before the pneumatic system has had an opportunity to move the thread part 30 to the dotted line position shown in Fig. 14. The cutter 85 is able to cut thread T' while the remover remains up, and is not dependent for its operation upon the transferrer arm or remover.

The foregoing description sets forth matting of the two threads T and T' as the reason why thread T' is drawn into the remover. Under some conditions, however, thread T' will be drawn into the remover even though the two threads are not matted together. When this happens it will still be necessary to cut thread T'. It is to be understood that the invention does not depend upon thread matting for its operation, nor is it limited necessarily to those conditions in which the two threads are matted together. In the broader aspects of the invention it is sufficient if thread T' extends into the remover and is then cut, without regard to the particular manner in which the thread happened to get in the remover.

From the foregoing it will be seen that I have provided means for cutting a thread extending in an abnormal position between the pneumatic thread remover and pneumatic thread holder, cutting of the thread being followed by removal of its cut parts by the pneumatic devices. In the first two forms of the invention the cutter mechanisms are operated by parts having a movement incident to a weft replenishing operation of the loom, but in the third form of the invention the cutter has regular movements not dependent upon weft replenishment and therefore able to cut the thread more promptly after it has been released from the selvage by the cutter C. Furthermore, in each instance the cutter has a zone of operation spaced from the normal positions of the threads T and T' and therefore does not cut the latter when they extend properly from the selvage to their respective pneumatic controls. In the first two forms of the invention the threads which are left by a weft replenishing operation are cut on a subsequent replenishing operation of the loom, but this is not necessarily true with the third form of the invention, although the latter can operate on a replenishing beat of the loom.

Having thus described my invention it will be seen that changes and modifications may be made therein by those skilled in the art without departing from the spirit and scope of the invention and I do not wish to be limited to the details herein disclosed, but what I claim is:

1. In a weft replenishing loom, pneumatic thread remover means, pneumatic thread holder means, the loom having a thread extending between the remover means and holder means, each of said pneumatic means tending to draw the thread thereinto but prevented from doing so by the other pneumatic means, and thread cutter means effective to cut said thread between said remover means and holder means, whereupon each pneumatic means is effective to draw thereinto that part of the thread extending therefrom to the cutter means.

2. In a weft replenishing loom, pneumatic thread remover means, pneumatic thread holder means, thread guide means forward of the remover means, the loom having a thread extending between the pneumatic means and engaging the guide means and extending from the latter rearwardly to the remover means, each pneumatic means tending to draw the thread thereinto but prevented from doing so by the other pneumatic means, and a thread cutter effective to cut that part of the thread between the guide means and remover means.

3. In a weft replenishing loom, pneumatic thread remover means, pneumatic thread holder means, the loom having a thread the ends of which extend one into the remover means and the other into the holder means, each pneumatic means tending to draw the thread thereinto but prevented from doing so by the other pneumatic means, actuator means deriving motion from the loom when the latter is in operation, and a thread cutter for said thread operated by the actuating means and effective to cut the thread between the remover means and the holder means, whereupon each pneumatic means draws thereinto that part of the thread extending therefrom to the thread cutter.

4. In a weft replenishing loom, pneumatic thread remover means, pneumatic thread holder means, the loom having two threads remaining subsequent to a weft replenishing operation, one of said threads extending from the selvage into the pneumatic thread remover and the other thread extending from the selvage into the pneumatic thread holder, each pneumatic means tending to draw thereinto the thread extending thereinto, a selvage cutter to cut both of said threads at the selvage and effective in the cutting operation thereof to cause said threads to cling together so that said other thread is drawn into the remover by said one thread, and parting means to part said other thread between the thread remover and thread holder.

5. In a weft replenishing loom, pneumatic thread remover means, pneumatic thread holder means, the loom having a thread extending along a path normal therefor from the selvage into the thread remover and having a second thread extending along a path normal therefor from the selvage into the thread holder, selvage cutter means cutting both of said threads at the selvage, each thread thereafter being drawn along the path normal therefor into the pneumatic means corresponding thereto if the selvage cutter has cut said threads normally, said threads if matted together by the selvage cutter means due to abnormal cutting thereby clinging to each other so that a length of at least one of said threads assumes a position abnormal to either of said paths, and cutter means effective to part said length of thread in abnormal position.

6. In a weft replenishing loom in which two threads remain attached to the selvage subsequent to a replenishing operation, a pneumatic thread remover into which one of said threads extends, a pneumatic thread holder into which the other thread extends, a selvage cutter to cut said threads at the selvage, a hook engaging said other thread between the selvage cutter and the thread holder, one of said threads being abnormally placed between the thread remover and said hook in the event that said threads are matted together incident to operation of the selvage cutter, and thread cutter means effective to cut the abnormally placed thread.

7. In a weft replenishing loom, pneumatic thread remover means, pneumatic thread holder means, a selvage cutter, the loom having a thread normally extending from the selvage to the remover means and having a second thread normally extending from the selvage to the holder means, and a thread parter ineffective to cut either of said threads when the latter extend normally to their respective pneumatic means, said selvage cutter cutting said threads and matting said threads together so that due to pneumatic action of said remover means and holder means at least one of said threads occupies an abnormal position and extends from the remover means to the holder means, and said thread parter being effective to cut only the thread in abnormal position.

8. In a weft replenishing loom in which two threads extend from the selvage, pneumatic thread remover means into which one of said threads extends along a path normal therefor, pneumatic thread holder means into which the other thread extends along a path normal therefor, a selvage cutter which cuts said threads at the selvage, cutting mechanism having a zone of operation located between said paths, and means causing said cutter mechanism to cut either thread should the latter due to attachment to the other thread resulting from operation of the selvage cutter be drawn pneumatically into said zone.

9. In a weft replenishing loom, pneumatic thread remover means, pneumatic thread holder means, the loom having a thread extending between and attracted by said pneumatic means, and means operating incident to a weft replenishing operation of the loom to cut said thread between said means.

10. In a weft replenishing loom in which a thread remaining from a weft replenishing operation of the loom extends between pneumatic remover means and pneumatic holder means each of which tends to draw the thread thereinto, thread parter mechanism to cut said thread between said means, and means operative incident to a subsequent weft replenishing operation of the loom causing said thread parter to cut said thread.

11. In a weft replenishing loom, pneumatic thread remover means, pneumatic thread holder means, the loom having a thread extending between and attracted by said pneumatic means, a hook engaging the thread between the remover and the thread holder, and means operating incident to a weft replenishing operation of the loom cutting said thread at a point between the thread remover and the hook.

12. In a weft replenishing loom in which a thread remaining from a weft replenishing operation extends between and is attracted by a pneumatic remover means and a pneumatic holder means, a hook engaging the thread between the remover means and holder means, and a thread parter operative incident to a weft replenishing operation of the loom subsequent to said replenishing operation to part said thread at a point between said hook and said pneumatic means to enable each pneumatic means to remove the part of the thread adjacent thereto.

13. In a weft replenishing loom, pneumatic thread remover means, pneumatic thread holder means, the loom having a thread extending between said remover means and holder means, each pneumatic means tending to draw the thread thereinto, a transferrer arm having an operating stroke on replenishing beats of the loom, and thread cutter mechanism operated by a force derived from the transferrer arm when the latter has an operating stroke and effective to cut said thread.

14. In a weft replenishing loom, pneumatic thread remover means, pneumatic thread holder means, the loom having a thread extending between said remover means and holder means, each pneumatic means tending to draw the thread thereinto, a transferrer arm having an operating stroke on replenishing beats of the loom, and thread cutter mechanism operated by a force derived from the transferrer arm when the latter has an operating stroke and effective to cut said thread.

15. In a weft replenishing loom, pneumatic thread remover means, pneumatic thread holder means, the loom having a thread extending between said remover means and holder means, each pneumatic means tending to draw the thread thereinto, a transferrer arm having an operating stroke on replenishing beats of the loom, thread cutter mechanism, means mounting the cutter mechanism on the transferrer arm for angular adjustment relatively thereto and also at different distances from the transferrer arm measured in a direction transversely of the thread, and means causing said cutter mechanism to cut the thread when said transferrer arm has an operating stroke.

16. In a weft replenishing loom, pneumatic thread remover means, pneumatic thread holder means, the loom having a thread extending between said remover means and holder means, each pneumatic means tending to draw the thread thereinto, a transferrer arm having an operating stroke on replenishing beats of the loom, a cutter mechanism mounted on said transferrer arm including cutter blades one movable relatively to the other, and operating means having one end fixed at the other end connected to said one blade causing movement of the latter to effect cutting of the thread when the transferrer arm has an operating stroke.

17. In a weft replenishing loom having holding means for one end of a thread, a movable thread remover into which the other end of the thread is pneumatically drawn, thread cutting mechanism, actuating means on the remover for the cutting mechanism, and operating means moving the remover to place the thread in cutting position relatively to the cutting mechanism and causing the actuating means to operate the cutting mechanism to cut the thread, the part of the thread between the cutting mechanism and the remover thereupon being drawn into the latter.

18. In a weft replenishing loom having holding means for one end of a thread, a movable thread remover into which the other end of the thread is drawn pneumatically, said remover means moving from one position thereof to another position thereof incident to a weft replenishing operation of the loom, thread cutting mechanism mounted in a stationary position spaced from the thread when the remover means is in said one position thereof but in cutting relation with respect to the thread when the remover means is in said other position thereof, and means actuated by the remover means when the latter moves to said other position thereof to cause the cutting mechanism to sever the thread, whereupon the remover pneumatically draws thereinto that part of the thread extending therefrom to the cutting mechanism.

19. In a weft replenishing loom having holding means for one end of a thread, a movable thread remover into which the other end of the thread is drawn pneumatically, said remover means moving from one position thereof to another position thereof incident to a weft replenishing operation of the loom, thread cutting mechanism spaced from the thread when the remover means is in said one position thereof but in cutting relation with respect to the thread when the remover means is in said other position thereof, means mounting said cutter mechanism in stationary position adjusted relatively to said other position of the remover transversely of the thread, and means effective when the remover means moves to said other position thereof to cause the cutting mechanism to sever the thread, whereupon the remover pneumatically draws thereinto that part of the thread extending therefrom to the cutting mechanism.

20. In a weft replenishing loom having a length of thread extending from and movable with a pneumatic thread remover which has a movement incident to a weft replenishing operation of the loom, cutting mechanism into cutting relation with respect to which the remover places the thread when having said movement, and means actuating the cutting mechanism to cut the thread after the remover by movement thereof has placed the thread in cutting relation with respect to the cutting mechanism, whereupon said remover draws thereinto that part of the thread extending therefrom to the cutting mechanism.

21. In a weft replenishing loom having a thread extending from and movable with a pneumatic thread remover which has an upward movement subsequent to a weft replenishing operation of the loom, thread cutting mechanism above the thread, the thread during upward movement of the remover being moved thereby into cutting position relatively to the cutting mechanism, and actuating means causing said cutting mechanism to sever the thread after the thread has moved to said cutting position, whereupon said remover draws thereinto that part of the thread extending therefrom to the cutting mechanism.

22. In a weft replenishing loom having a length of thread extending from and movable with a pneumatic thread remover which has an upward movement subsequent to a weft replenishing operation of the loom, a thread cutting mechanism having separate cutting jaws above the thread, the latter during upward movement of the remover being moved by the latter into cutting position between said jaws, and actuating means on the remover operating during upward movement of the remover to cause relative movement of said jaws to sever the thread after the latter has moved into said cutting position, whereupon said remover draws thereinto that part of the thread extending therefrom to the cutting mechanism.

23. In a weft replenishing loom having holding means for one end of a thread, movable thread remover means into which the other end of the thread is drawn pneumatically, thread cutting mechanism comprising stationary and movable cutter blades in open thread receiving position, operating means moving the remover to place the thread in cutting position between the blades, and an actuating roller on the remover effective due to movement of the remover to cause the movable blade to cooperate with the stationary blade to effect cutting of the thread after the latter has moved between said blades, whereupon that part of the thread extending from the cutting mechanism to the remover is drawn into the latter.

24. In a weft replenishing loom, pneumatic thread remover means, pneumatic thread holder means, the loom from time to time having a thread one end of which extends into the remover means and the other end of which extends into the holder means, each pneumatic means preventing the other means from drawing the thread thereinto, a thread cutter, and an actuator having regularly recurring movements during loom operation causing said cutter to sever any thread extending from the remover means to the holder means, each pneumatic means thereupon removing that part of the thread extending therefrom to the thread cutter.

25. In a weft replenishing loom, pneumatic thread remover means, pneumatic thread holder means, the loom having a thread extending from the cloth selvage into the remover means and having another thread extending from the selvage into the holder means incident to each weft replenishing operation of the loom, a selvage cutter cutting said threads at the selvage in such manner that said threads cling together, whereupon the remover means draws thereinto the first named thread and part of said other thread without removing the latter from the thread holder, an actuator having regularly recurring movements during loom operation, and thread parter means operated regularly by said actuator and effective to cut said other thread, each pneumatic means thereupon drawing thereinto that part of said other thread extending therefrom to said thread parter means.

26. In a weft replenishing loom having two threads extending from the cloth selvage, a thread parter having normally open cutter jaws, pneumatic thread remover means into which one of said threads extends, pneumatic thread holder means into which the other thread extends, each pneumatic means tending to draw thereinto the thread extending thereinto, a selvage cutter cutting said threads at the selvage and said threads thereupon clinging together and being drawn pneumatically away from the selvage in such manner that one of said threads moves to a position between said open jaws, and means thereafter causing said jaws to close to cut the thread between them.

27. In a weft replenishing loom having two threads extending from the cloth selvage, a thread parter having normally open cutter jaws, pneumatic thread remover means having an intake mouth into which one of said threads extends, pneumatic thread holder means into which the other thread extends, each pneumatic means tending to draw thereinto the thread extending thereinto, a hook between the selvage and holder means holding said other thread spaced from the remover means, said intake mouth and said hook being on a straight line passing between said open jaws, a selvage cutter cutting said threads at the selvage in such manner that said threads cling together, said remover means thereupon drawing thereinto said one thread and part of said other thread and causing said part to move away from said selvage and lie along said line, and means thereafter closing said jaws to cut said part of thread.

28. In a weft replenishing loom, pneumatic thread remover means, pneumatic thread holder means, the loom having a thread which when in normal position extends from the cloth selvage into the remover means and having a second thread which when in normal position extends from the selvage into the holder means, a selvage cutter cutting said threads at the selvage in such manner that the threads cling together, whereupon each pneumatic means tends to draw thereinto the thread corresponding thereto and the threads move away from the selvage toward a position of alignment due to the fact that said threads are attached to each other, and thread parter means spaced from the normal position of each of said threads and toward which at least one of said threads moves and is cut subsequent to selvage cutting, whereupon said pneumatic means removes the parts of the thread cut by said thread parter.

29. In a weft replenishing loom, a pneumatic thread remover moving from normal position to operating position and then returning to normal position incident to a replenishing operation of the loom, the loom having two threads attached to the cloth selvage one of which is partly drawn into the remover when the latter is in operating position and then moves with the remover as the latter returns to normal position, a selvage cutter capable of cutting said threads from the cloth when the remover is either in normal or operating position, a thread parter in thread receiving position when the remover returns to normal position, said threads having parts thereof matted together subsequent to cutting by the selvage cutter and the remover whether in normal or operating position being thereupon effective to draw thereinto said one thread and part of the other thread, the remover when returning to normal position placing said other thread in position for cutting by said parter, and means thereafter causing said parter to cut said other thread when the remover is in normal position and before the remover again moves to the operating position thereof.

30. In a weft replenishing loom having two threads remaining attached to the cloth selvage subsequent to a weft replenishing operation, a pneumatic thread remover moving from normal position to operating position to draw thereinto one of said threads and then returning to normal position incident to said replenishing operation, a thread parter normally in thread receiving position, a selvage cutter operating subsequent to said weft replenishing operation and while the remover is in the normal position thereof to cut said threads from the selvage, said threads having adjacent parts thereof matted together subsequent to said cutting by the selvage cutter and the remover being thereupon effective pneumatically to draw thereinto said one thread and part of the other thread and move the latter into cutting position relatively to the parter, and means thereafter effective while the remover is in the normal position thereof and prior to the next weft replenishing operation to cause the parter to cut said other thread.

31. In a weft replenishing loom in which weft replenishing operations occur in succession during loom operation, two threads remaining attached to the cloth selvage subsequent to a weft replenishing operation, a pneumatic thread remover moving from normal position to operating position to draw thereinto one of said threads and then returning to normal position incident to said replenishing operation, a thread parter in thread receiving position when the remover returns to normal position, a selvage cutter operating subsequent to said replenishing operation and while the remover is in normal position to cut said two threads from the selvage, said threads having adjacent parts thereof matted together subsequent to cutting by the selvage cutter and said remover being effective to draw thereinto said one thread and part of the other thread and move the latter pneumatically into cutting position relatively to the parter while the latter is in thread receiving position, and means thereafter effective while the remover is in normal position and prior to the next replenishing operation to cause the parter to cut said other thread.

RICHARD G. TURNER.

REFERENCES CITED

The following references are of record in the file of this patent:

UNITED STATES PATENTS

| Number | Name | Date |
| --- | --- | --- |
| 2,336,321 | Turner | Dec. 7, 1943 |